(12) United States Patent
Geisler et al.

(10) Patent No.: US 7,894,953 B2
(45) Date of Patent: Feb. 22, 2011

(54) INTERIOR COMPONENT MANAGEMENT OF A VEHICLE VIA OCCUPANT MONITORING

(75) Inventors: Scott P. Geisler, Clarkston, MI (US); Galen E. Ressler, White Lake, MI (US); Richard K. Deering, Clinton Township, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 984 days.

(21) Appl. No.: 11/734,975

(22) Filed: Apr. 13, 2007

(65) Prior Publication Data

US 2008/0255725 A1    Oct. 16, 2008

(51) Int. Cl.
G06F 17/00   (2006.01)
G06F 7/00   (2006.01)

(52) U.S. Cl. .......................................... 701/36; 701/62

(58) Field of Classification Search ............. 701/45–47, 701/36, 62
See application file for complete search history.

(56) References Cited

U.S. PATENT DOCUMENTS 5,425,686 A * 6/1995 Grange ........................ 477/79

6,389,346 B1 * 5/2002 Gianoglio et al. ............. 701/51

FOREIGN PATENT DOCUMENTS

DE    10249686 A1    5/2004
DE    102005023214 A1    11/2006

OTHER PUBLICATIONS

Chinese Office Action issued on Jul. 2, 2010, for Application No. 200810091749.6.

* cited by examiner

Primary Examiner—Yonel Beaulieu
(74) Attorney, Agent, or Firm—Ingrassia Fisher & Lorenz, P.C.

(57) ABSTRACT

Systems and methods are provided for managing an interior component of a vehicle. A system includes a device for monitoring a passenger, a vehicle speed detector, and a controller in communication the interior component, the passenger monitoring device, and the vehicle speed detector, wherein the controller is configured to disable at least one function of the interior component if the rate of speed is greater than a predetermined threshold speed and enable the disabled function(s) when the passenger attempts to actuate the function(s). One method includes the steps of determining a rate of speed the vehicle is traveling, disabling at least one function of the interior component when the rate of speed is greater than a predetermined threshold speed, and enabling the disabled function(s) when the rate of speed is greater than the threshold speed if a passenger attempts to actuate the function(s).

20 Claims, 4 Drawing Sheets

INTERIOR COMPONENT MANAGEMENT OF A VEHICLE VIA OCCUPANT MONITORING

FIELD OF THE INVENTION

The present invention generally relates to vehicles, and more particularly relates to a system for managing interior components of a vehicle.

BACKGROUND OF THE INVENTION

For safety reasons, current interior component management systems of vehicles (e.g., automobiles) may disable one or more features of an interior component when the vehicle is traveling at a rate of speed greater than a predetermined threshold speed. When disabled, neither the driver nor passengers are able to actuate the disabled feature(s). This is the case even though passengers may be able to safely utilize the feature(s).

Accordingly, it is desirable to provide systems and methods for managing interior components of a vehicle so that the interior components may be utilized by a passenger while the vehicle is traveling at a speed greater than the threshold speed. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

Systems are provided for managing an interior component of a vehicle. One system includes a device for monitoring a passenger (e.g., a camera), a vehicle speed detector, and a controller connected to the interior component, the passenger monitoring device, and the vehicle speed detector, wherein the controller is configured to disable at least one function of the interior component if the rate of speed is greater than a predetermined threshold speed and enable the at least one function if the passenger attempts to actuate the function(s) when the rate of speed is greater than the threshold speed. Another system includes means for determining a rate of speed the vehicle is traveling, means for enabling and disabling at least one function of the interior component, the at least one function being disabled when the rate of speed is greater than a predetermined threshold speed and enabled when the rate of speed is less than the threshold speed, means for detecting an attempt to actuate the at least one function when the rate of speed is greater than the threshold speed, and means for enabling the at least one disabled function when the rate of speed is greater than the threshold speed if the attempt to actuate the at least one function is performed by the passenger.

Methods are also provided for managing an interior component of a vehicle. One method includes the steps of determining a rate of speed the vehicle is traveling, disabling at least one function of the interior component when the rate of speed is greater than a predetermined threshold speed, and enabling at least one function when the rate of speed is greater than the threshold speed if a passenger attempts to actuate the at least one function. Another method for managing an interior component of a vehicle includes the steps of detecting an attempt to actuate a gear shift actuator and disabling the gear shift actuator if a passenger is responsible for attempting to actuate the gear shift actuator.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
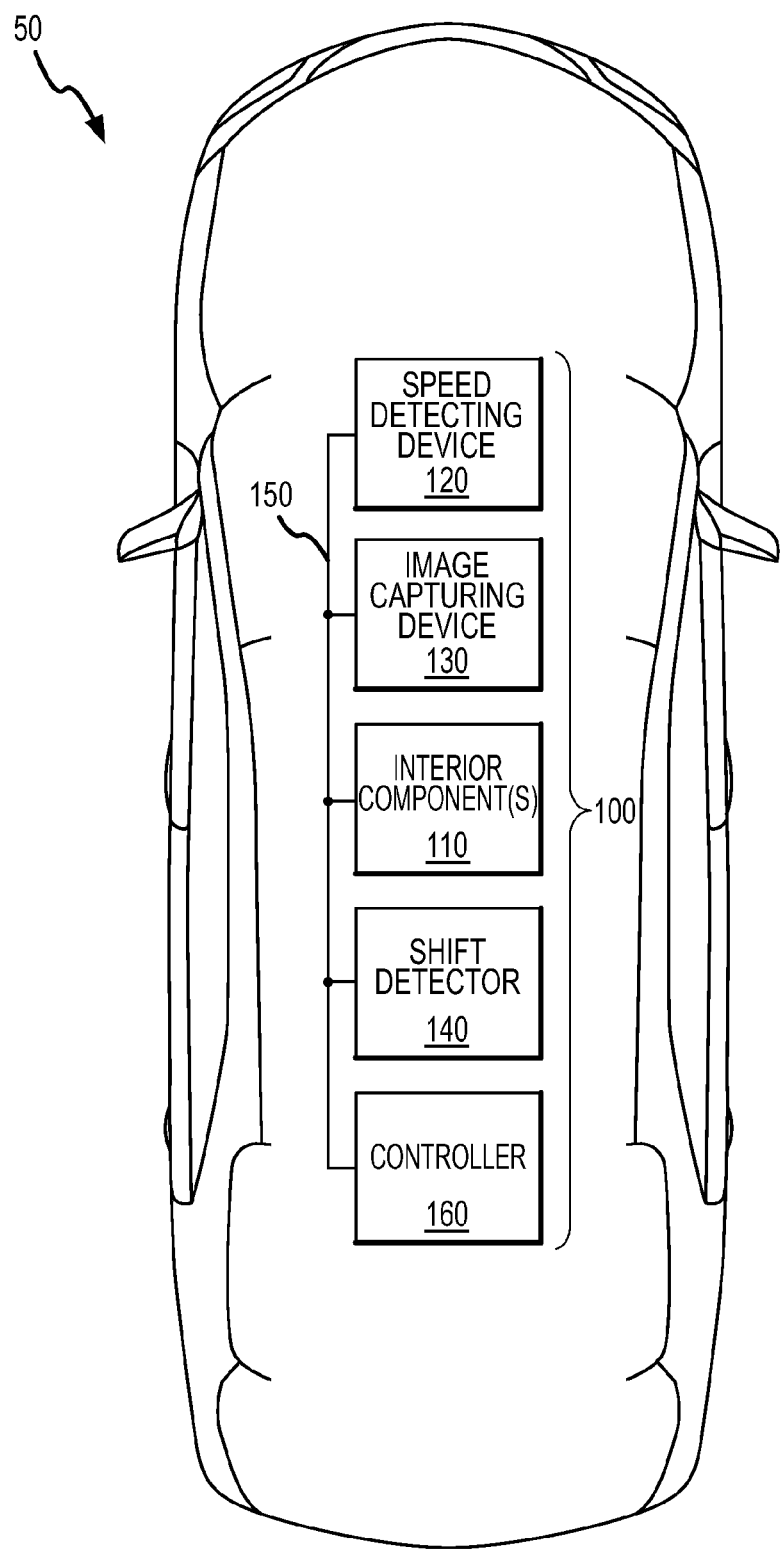
FIG. 1 is a diagram of one exemplary embodiment of a system for managing one or more interior components of a vehicle.

FIG. 1 is a diagram of one exemplary embodiment of a vehicle 50 (e.g., an automobile) including a system 100 for managing one or more interior components 110 of vehicle 50. Examples of interior components 110 include, but are not limited to, navigation systems, communication systems (e.g., cellular telephones, devices capable of sending/receiving email, etc.), entertainment systems (e.g., radios, CD players, DVD players, MP3 players, etc.), personalization systems (e.g., pre-set seat adjustment, pre-set radio station preferences, ride tuning, shift tuning, etc.), climate controllers, and the like.

In addition, at least one interior component 110 includes one or more functions capable of being disabled and enabled by another device (e.g., a controller 160, discussed below) during operation of vehicle 50. For example, a navigation system having global positioning system functions often includes a screen that displays the area proximate to the current location of vehicle 50 or a map indicating a path to a desired destination capable of being disabled and enabled by controller 160. Moreover, a navigation system often includes a device (e.g., a keyboard, a touch pad, a touch screen, a mouse, and the like) by means of which an operator may input data (e.g., an address of a desired destination). Similarly, an entertainment system, for example, oftentimes includes menus, volume controls, and the like capable of being disabled and enabled by controller 160. Accordingly, interior components 110 may include actuators (e.g., buttons, touch pads, touch screens, key pads, switches, a mouse, a voice-recognition device, and/or the like) that controls one or more of the functions of the interior component.

System 100 includes at least one interior component 110 coupled to controller 160 that detects when an attempt is made to operate the actuator of the interior component 110. Furthermore, system 100 includes a speed detecting device 120 (e.g., hardware, and/or software) for transmitting vehicle speed to controller 160.

As is known in the art, some automobiles, for example, also include either an electronic manual transmission gear shift actuator or an electronic automatic transmission gear shift actuator (e.g., a "shift-by-wire" gear shift actuator) to engage operation of the automobile. Accordingly, system 100 includes a gear shift actuation detector 140 (e.g., hardware and/or software) coupled to the electronic gear shift actuator of vehicle 50 and in communication with controller 160 via bus 150, wherein gear shift actuation detector 140 is configured to detect when an attempt to shift the gear shift actuator occurs.

In addition, system 100 includes an image capturing device 130 (e.g., a video camera, a still image camera, an infrared camera, a radar system, or other device based upon electromagnetic radiation, acoustic waves, light, and/or the like devices or systems) for monitoring the presence and/or position of a person seated in a non-driver seat (i.e., a passenger). Image capturing device 130 is configured to monitor the passenger on a continuous, substantially continuous, or occasional basis. Furthermore, image capturing device 130 is configured to detect the position and/or movement of the passenger's arm in relation to one or more of interior components 110.

System 100 includes a bus 150 (e.g., a wired and/or wireless interface) coupling interior component(s) 110, speed detecting device 120, and image processor 135 (and image capturing device 130) to one another, and to controller 160. Controller 160 includes hardware, software, and/or firmware suitably configured to manage one or more functions of at least one interior component 110 during operation of vehicle 50.

Furthermore, controller 160 is configured to enable and disable one or more functions of at least one interior component 110 based upon predetermined criteria. In one exemplary embodiment, controller 160 is configured to receive a signal indicating the present rate of speed of vehicle 50 is traveling and disable one or more functions of at least one interior component 110 when the rate of speed is greater than a predetermined rate of speed (e.g., greater than approximately 5 miles-per-hour). Moreover, controller 160 is configured to receive signals from at least one interior component indicating that one of its actuators has been actuated (i.e., a person has attempted to utilize one or more of its functions).

For example, controller 160 is configured to receive a signal from a navigation system indicating that a person is attempting to enter a desired address into the navigation system via a touch screen. Other examples might include controller 160 receiving a signal from a cellular telephone indicating that a person is attempting to enter a telephone number into the cellular telephone or receiving a signal from an entertainment system indicating that a person is attempting to utilize a menu linked to various functions of the entertainment system.

Furthermore, controller 160 is configured to receive a signal from image capturing device 130 indicating the presence of a passenger in vehicle 50. Additionally, controller 160 is configured to receive a signal from image capturing device 130 indicating a position of the passenger's arms. Moreover, controller 160 is configured to receive a signal from image capturing device 130 indicating a position of the passenger's arms in relation to one or more of interior components 110.

In addition, controller 160 is configured to compare the signal received from the interior component 110 that was actuated to the signal received from image capturing device 130 and correlate the likelihood that the passenger is responsible for attempting to actuate the function(s). Moreover, controller 160 is configured to enable the function(s) even though vehicle 50 may be traveling faster than the threshold speed when controller 160 determines that the correlation indicates that there is high likelihood that the passenger is responsible for attempting to actuate the function(s) of interior component 110.

Controller 160 is also configured to determine a correlation exists when the signal received from image capturing device 130 indicates that a passenger is present in the passenger seat of vehicle 50 when the attempt to actuate the function(s) occurred. Moreover, controller 160 is configured to determine a correlation exists when the signal received from image capturing device 130 indicates that the passenger's appendage (e.g., arm) is proximate to or within a predetermined threshold distance (e.g., a distance in the range of about 0.5 inches to about 12 inches) of the interior component 110 when the attempt to actuate the function(s) occurred.

Furthermore, controller 160 is configured to continue to disable the function(s) of the interior component(s) 110 when the correlation indicates that there is not a high likelihood that the passenger is responsible for attempting to actuate the function(s). In one embodiment of controller 160, there is not a high likelihood that the passenger is responsible for attempting to actuate the function(s) when the signal received from image capturing device 130 indicates that a passenger is not present in the passenger seat of vehicle 50 when the attempt to actuate the interior component 110 occurred. In another embodiment of controller 160, there is not a high likelihood that the passenger is responsible for attempting to actuate the function(s) when the signal received from image capturing device 130 indicates that a passenger's arm is not proximate to the interior component 110 when the attempt to actuate the function(s) 110 occurred.

Controller 160 is configured to disable the manual transmission gear shift actuator or the automatic transmission gear shift actuator when a signal received from image capturing device 130 indicates that a passenger is proximate to the manual or automatic transmission gear shift actuator when an attempt to utilize the gear shift actuator occurred. Moreover, controller 160 is configured to disable the manual or automatic transmission gear shift actuator when a signal received from image capturing device 130 indicates that a passenger's appendage (e.g., arm) is proximate to the gear shift actuator when an attempt to utilize the gear shift actuator occurred.

In addition, controller 160 is configured to enable the manual or automatic transmission gear shift actuator when a signal received from image capturing device 130 indicates that a passenger is not proximate to the manual or automatic transmission gear shift actuator when an attempt to utilize the gear shift actuator occurred. Similarly, controller 160 is configured to enable the manual or automatic transmission gear shift actuator when a signal received from image capturing device 130 indicates that a passenger's arm is not proximate to the gear shift actuator when an attempt to utilize the gear shift actuator occurred.

Furthermore, controller 160 is configured to enable each function of each interior component 110 when vehicle 50 is either stopped or traveling at a speed below the threshold speed. Moreover, controller 160 is configured to enable each function of each interior component 110 when vehicle 50 slows to speed below the threshold speed. Additionally, controller 160 is configured to disable specified function(s) of each interior component 110 when vehicle 50 is traveling in reverse.

Controller 160 is additionally configured to substantially immediately disable one or more functions of at least one interior component 110 when the rate of speed of vehicle 50 reaches the threshold speed, even though actuation of the function occurred prior to vehicle 50 reaching the threshold speed. Furthermore, controller 160 is configured to continue to enable one or more functions of at least one interior component 110 when the speed of vehicle 50 reaches the threshold speed if actuation of the function occurred prior to vehicle 50 reaching the threshold speed.

Figure 2:
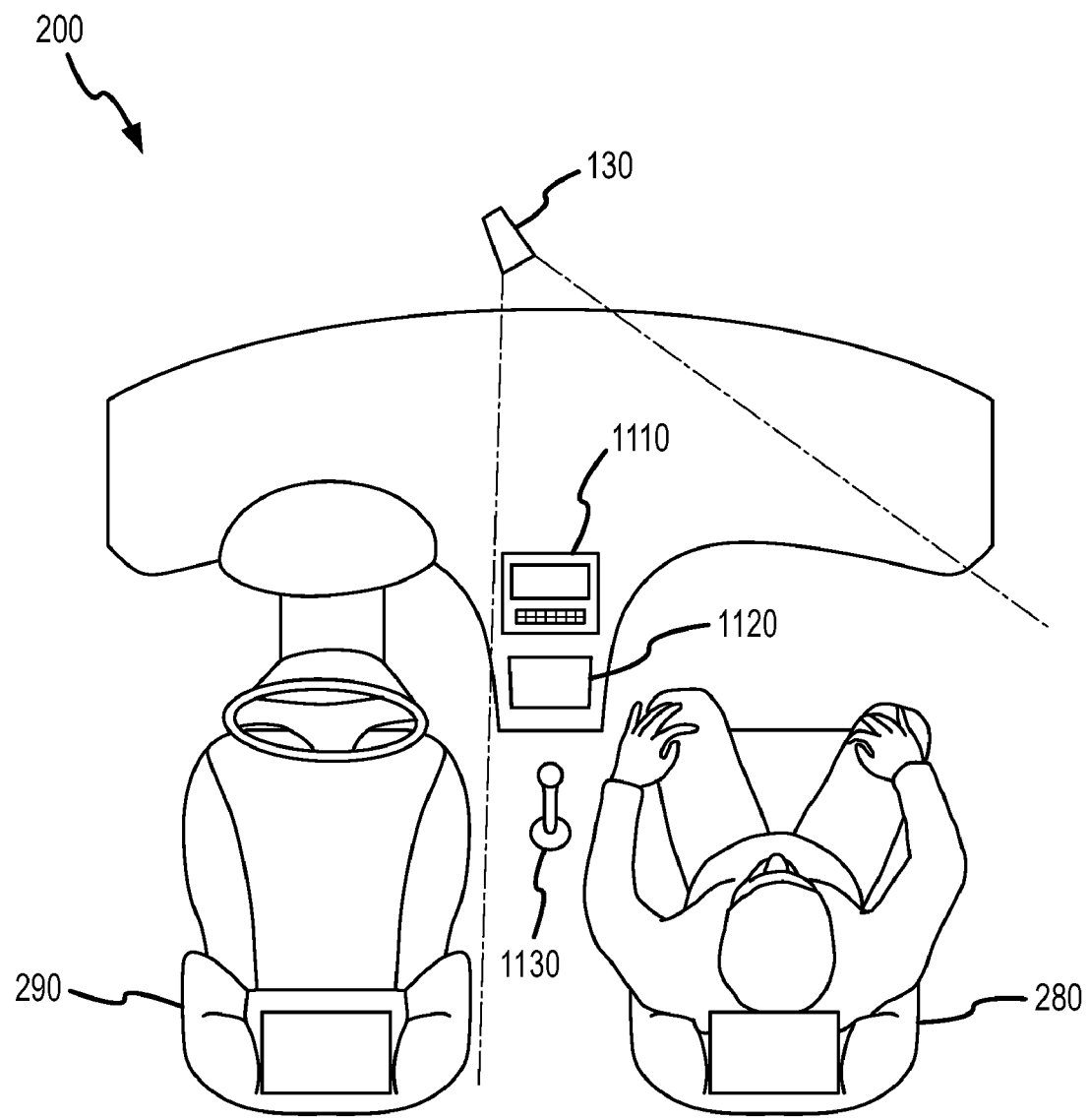
FIG. 2 is a diagram illustrating an interior compartment of a vehicle including one embodiment of the system of FIG. 1.

FIG. 2 is a diagram illustrating an exemplary interior compartment 200 of vehicle 50 including system 100. Image capturing device 130 may be mounted on, for example, the dashboard or anywhere else on or within vehicle 50 that would enable image capturing device 130 to monitor an area (e.g., the area defined by the dashed lines in FIG. 2) including a passenger seat 280 and interior component(s) 110.

As illustrated in FIG. 2, interior compartment 200 includes three interior components: a navigation system 1110, an entertainment system 1120, and a manual transmission gear shift actuator 1130 (including gear shift actuation detector 140) configured to communicate each attempt to actuate one or more of its respective functions to controller 160. In this example, controller 160 is capable of disabling one or more functions of navigation system 1110 and/or entertainment system 1120 when vehicle 50 is traveling faster than the threshold speed. Furthermore, controller 160 is configured to enable one or more disabled functions of navigation system 1110 and/or entertainment system 1120 when controller 160 determines that there is a high likelihood a passenger is responsible for attempting to actuate the interior component(s).

In addition, controller 160 may be configured to appropriately enable and disable manual transmission gear shift actuator 1140 depending on whether controller 160 determines that the driver or a passenger, respectively, is responsible for attempting to utilize manual transmission gear shift actuator 1140. Notably, interior compartment 200 may include a fewer number or a greater number of interior components than illustrated in FIG. 2.

Figure 3:
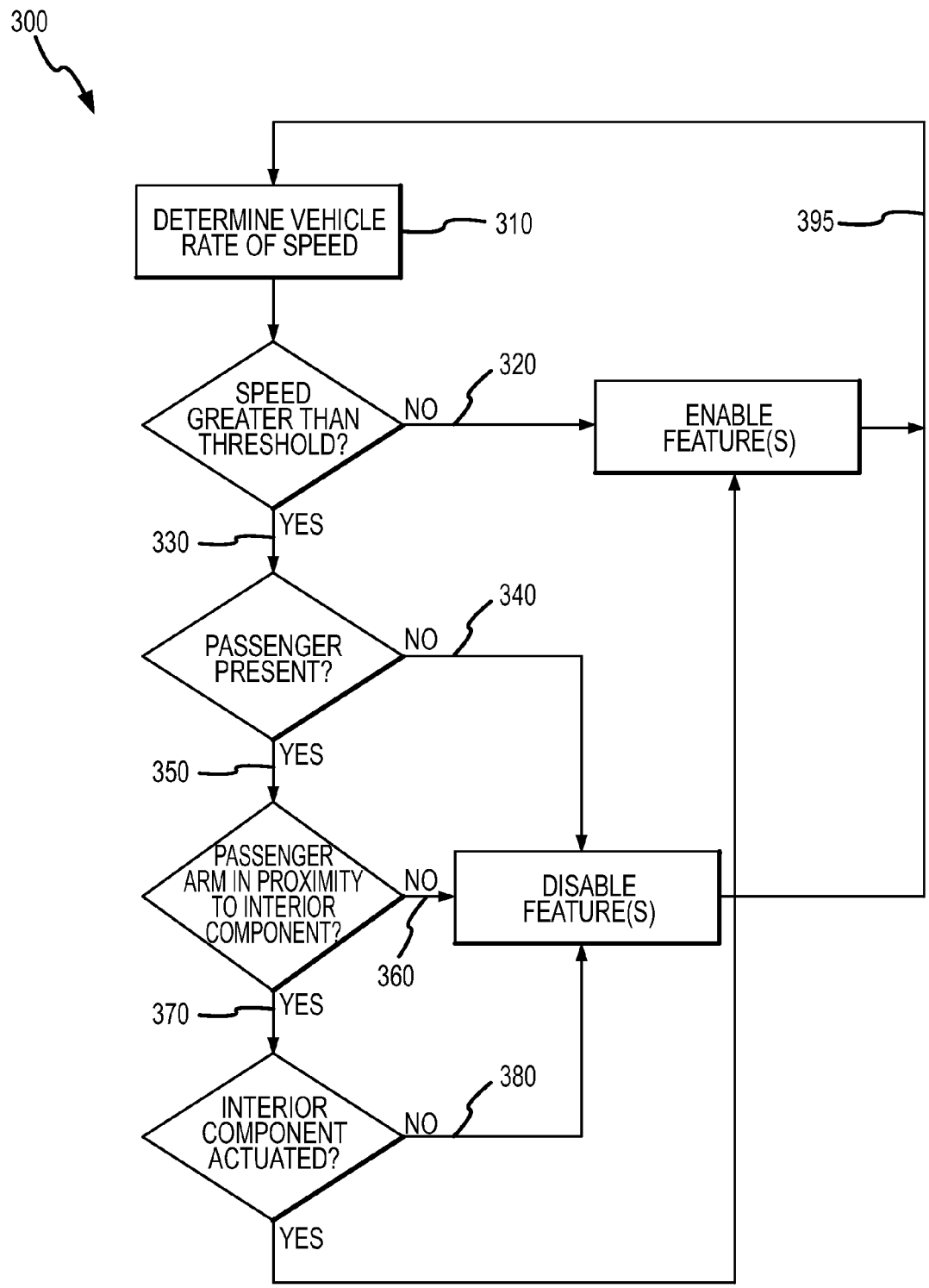
FIG. 3 is a flow diagram representing one embodiment of a method for managing one or more interior components of a vehicle.

FIG. 3 is a flow diagram representing one embodiment of a method 300 for managing at least one interior component (e.g., interior component(s) 110) in a vehicle (e.g., vehicle 50). In this embodiment, method 300 initiates by determining a rate of speed of vehicle 50 (step 310).

When the rate of speed of vehicle 50 is less than a predetermined threshold speed (e.g., a speed in the range of about 3 miles-per-hour to about 20 miles-per-hour), each feature of one or more interior components 110 is enabled (step 320). If the detected speed is greater than the threshold speed, step 330 includes determining if a passenger (e.g., a front passenger) is present.

If a passenger is not detected (i.e., not present), at least one feature of one or more interior components 110 is disabled (step 340). When a passenger is detected, step 350 includes determining if the passenger's arm is in proximity to the control of interior component 110.

When the passenger's arm is not in proximity to the control of interior component 110, step 360 includes disabling at least one feature of one or more interior components 110. If the passenger's arm is in proximity to the control of interior component 110, step 370 includes determining if there is an attempt to actuate the control of interior component 110.

If there is no attempt being made to actuate the control of interior component 110, at least one feature of one or more interior components 110 is disabled (step 380). When an attempt to actuate the control of interior component 110 is detected, step 390 includes enabling each feature of one or more interior components 110. In addition, method 300 includes repeating one or more of steps 310 through 390 as needed (step 395).

Figure 4:
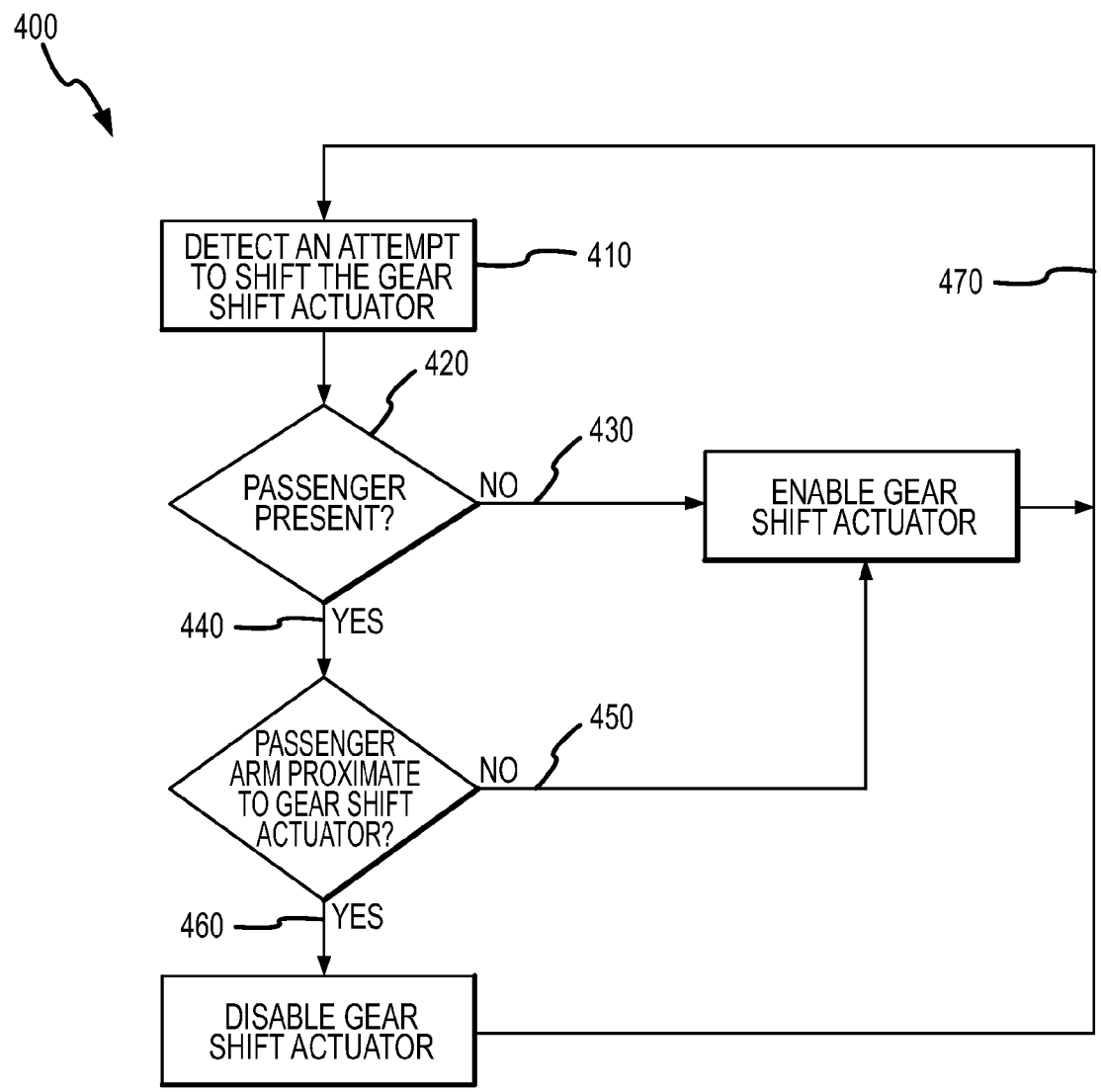
FIG. 4 is a flow diagram representing an embodiment of a method for managing a vehicle gear shift actuator.

FIG. 4 is a flow diagram representing one embodiment of a method 400 for managing a vehicle (e.g., vehicle 50) gear shift actuator. Method 400 begins by detecting an attempt to shift the gear shift actuator (step 410) and determining if a passenger (e.g., a front passenger) is present in vehicle 50 (step 420).

If a passenger is not detected, the gear shift actuator is enabled (step 430). When a passenger is detected, step 440 includes determining if the passenger's arm is proximate to the gear shift actuator when the attempt occurs (i.e., determining if the passenger may be responsible for attempting to shift the gear shift actuator).

When the passenger's arm is not proximate to the gear shift actuator when the attempt occurs, step 450 includes enabling the gear shift actuator. If the passenger's arm is proximate to the gear shift actuator when the attempt occurs, the gear shift actuator is disabled (step 460). In addition, method 400 includes repeating one or more of steps 410 through 460 for each subsequent attempt to shift the gear shift actuator (step 470).

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

We claim:

1. A system for managing an interior component of a vehicle capable of carrying a driver and at least one passenger, the system comprising:
a camera for monitoring the at least one passenger;
a vehicle speed detector; and
a controller in communication with each of the camera, the speed detector, and the interior component, wherein the controller is configured to:
disable at least one function of the interior component if a detected rate of speed is greater than a predetermined threshold speed, and
enable the at least one disabled function when the detected rate of speed is greater than the threshold speed if the passenger attempts to actuate the at least one function.

2. The system of claim 1, wherein the controller is further configured to enable the disabled function if an arm of the passenger is within a predetermined threshold distance of the interior component when the attempt occurred.

3. The system of claim 1, further comprising a gear shift actuator in communication with the controller, wherein the controller is further configured disable the gear shift actuator if the passenger attempts to actuate the gear shift actuator.

4. The system of claim 1, wherein the interior component is one of a navigation system, a communication system, a personalization system, and an entertainment system.

5. The system of claim 1, wherein the controller is further configured to enable the at least one disabled function if the detected rate of speed is less than the threshold speed.

6. A method for managing an interior component of a vehicle capable of carrying a driver and at least one passenger, the method comprising the steps of:
determining a rate of speed the vehicle is traveling;

disabling at least one function of the interior component when the rate of speed is greater than a predetermined threshold speed; and enabling the at least one disabled function when the rate of speed is greater than the threshold speed if the passenger attempts to actuate the at least one function.

7. The method of claim 6, further comprising the steps of:

detecting an attempt to actuate the at least one function when the rate of speed is greater than the threshold speed; and determining which of the driver and the passenger is responsible for the attempt to actuate the at least one function.

8. The method of claim 7, wherein the step of determining which of the driver and the passenger is responsible for the attempt to actuate the at least one function comprises the steps of:

detecting a position of an arm of the passenger in relation to the interior component; and correlating, in time, the position of the arm and the attempt to actuate the at least one function to determine if the arm is within a predetermined threshold distance of the interior component when the attempt to actuate the at least one function occurred.

9. The method of claim 8, wherein the enabling step comprises the step of enabling the at least one function when the correlating step determines that the arm is within the threshold distance when the attempt to actuate the at least one function occurred.

10. The method of claim 8, further comprising the step of:

continuing to disable the at least one function when the correlating step determines that the arm is not within the threshold distance when the attempt to actuate the at least one function occurred.

11. A method for managing a gear shift actuator of a vehicle capable of carrying a driver and at least one passenger, the method comprising the steps of:

detecting an attempt to actuate the gear shift actuator; and disabling the gear shift actuator if the passenger is responsible for attempting to actuate the gear shift actuator.

12. The method of claim 11, further comprising the step of determining which of the driver and the passenger attempted to actuate the gear shift actuator.

13. The method of claim 12, wherein the step of determining which of the driver and the passenger is responsible for the attempt to actuate the gear shift actuator comprises the steps of:

detecting a position of an arm of the passenger in relation to the gear shift actuator; and correlating, in time, the position of the arm of the passenger and the attempt to actuate the gear shift actuator to determine if the arm is within a predetermined threshold distance of the gear shift actuator when the attempt to actuate the gear shift actuator occurred.

14. The method of claim 13, wherein the disabling step comprises the step of disabling the gear shift actuator when the correlating step determines that the arm is within the threshold distance when the attempt to actuate the gear shift actuator occurred.

15. The method of claim 13, further comprising the step of enabling the gear shift actuator if the passenger is not responsible for attempting to actuate the gear shift actuator.

16. The method of claim 15, wherein the enabling step comprises the step of enabling the gear shift actuator when the correlating step determines that the arm is not within the threshold distance when the attempt to actuate the gear shift actuator occurred.

17. A system for managing an interior component of a vehicle capable of carrying a driver and at least one passenger, the system comprising:

a speed detecting device determining a rate of speed the vehicle is traveling;

a controller capable of enabling and disabling at least one function of the interior component, the at least one function being disabled when the rate of speed is greater than a predetermined threshold speed and enabled when the rate of speed is less than the threshold speed; and a detector detecting an attempt to actuate the at least one function when the rate of speed is greater than the threshold speed, wherein the controller enables the at least one disabled function when the rate of speed is greater than the threshold speed if the attempt to actuate the at least one function is performed by the passenger.

18. The system of claim 17, wherein:

the detector detects a position of an arm of a passenger in relation to the interior component; and the controller correlates, in time, the position of the arm and the attempt to actuate the at least one function to determine if the arm is within a predetermined threshold distance of the interior component when the attempt occurred.

19. The system of claim 18, wherein the controller enables the at least one function when the controller determines that the arm is within the threshold distance when the attempt occurred.

20. The system of claim 17, further comprising:

a detector detecting actuation of a gear shift actuator, wherein the controller disables the gear shift actuator when the passenger attempts to actuate the gear shift actuator.

* * * * *